United States Patent [19]

Smith

[11] 3,901,191
[45] Aug. 26, 1975

[54] LIQUID SUPPLEMENT FEEDER
[75] Inventor: Thomas E. Smith, Irvine, Calif.
[73] Assignee: Cargill, Incorporated, Minneapolis, Minn.
[22] Filed: Mar. 29, 1974
[21] Appl. No.: 456,353

[52] U.S. Cl. ............................................. 119/51 R
[51] Int. Cl.² ......................................... A01K 5/00
[58] Field of Search ..................... 119/51 R, 63, 53

[56] References Cited
UNITED STATES PATENTS
| | | | |
|---|---|---|---|
| 2,158,094 | 5/1939 | Teske | 119/51 R |
| 2,840,040 | 6/1958 | Turner | 119/51 R X |
| 3,459,159 | 8/1969 | Reed | 119/51 R |
| 3,734,060 | 5/1973 | Collison | 119/51 R |
| 3,738,329 | 6/1973 | Schweitzer | 119/63 |

Primary Examiner—J. N. Eskovitz
Attorney, Agent, or Firm—Fitch, Even, Tabin & Luedeka

[57] ABSTRACT

A liquid supplement feeder having a covered tank, a rotatable wheel within the tank, and an opening in the cover over the wheel. A slidable plate is provided adjacent the opening in the cover and is adapted to partially close or completely close the opening so as to limit access to the wheel.

3 Claims, 4 Drawing Figures

PATENTED AUG 26 1975　　　　　　　　　　　　　　　3,901,191

LIQUID SUPPLEMENT FEEDER

The present invention relates generally to animal feeding devices and more particularly to a liquid supplement feeder of the self-feeding type for animals.

In the feeding of animals, such as dairy or beef cattle, self-feeders are often used. Such afford longer intervals between the replenishing of feed on the feed lot, resulting in less labor than in a hand-feeding system where the replenishment is more frequent. Moreover, cattle generally gain more when fed from self-feeders, because of the availability of a constant supply of feed, than when fed by hand, even when the hand-feeding is by experienced dairy or cattlemen. In the self-feeding system, there is a tendency for animals to overeat and this results in high cost and less effective feeding control.

To balance the nutrient intake of cattle, it is common to provide a liquid supplement. If the supplement is fed free choice, as with self-feeders, the cattle are apt to eat more of the supplement than is needed to adequately balance the ration. In such instance, not only is the ration balance disturbed, but also the cost to the dairyman and the cattleman is increased over that which it should be for the ration.

It is an object of the present invention to provide a liquid supplement feeder of the self-feeding type that will restrict the consumption thereof by animals.

It is another object of the present invention to provide a liquid supplement feeder that will control the intake of liquid supplement by animals even when the animals have access to the feeder and supplement 24 hours a day.

These and other objects of the invention are more particularly set forth in the following detailed description and in the accompanying drawings of which:

Figure 1:
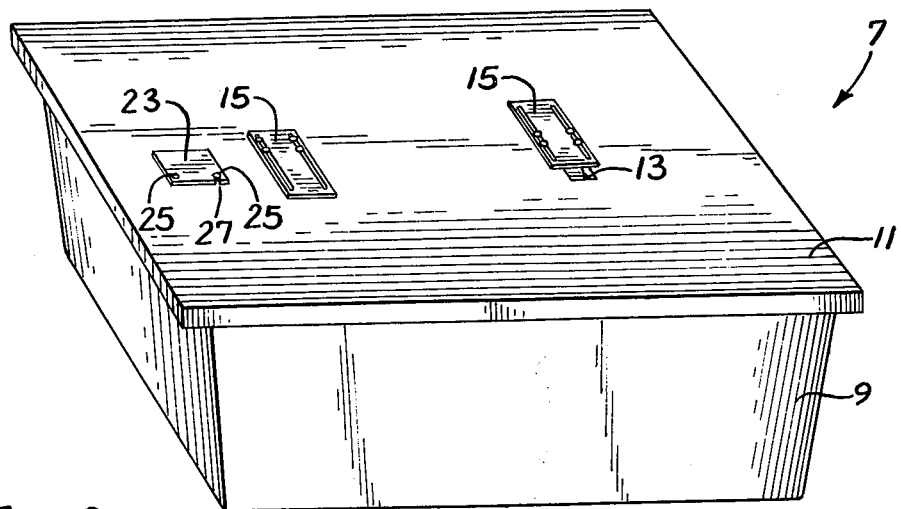
FIG. 1 is a perspective view of a liquid supplement feeder constructed in accordance with the principles of the present invention.

The present invention is directed primarily to a liquid supplement feeder of the self-feeder type that enables dairy or beef cattle to obtain a supplement to their daily feed ration for balancing the nutrient content of the ration while at the same time restricting intake and preventing overconsumption of the supplement. In accordance with another aspect of the invention, the present feeder is usable in combination with a liquid feed supplement having a predetermined acidity, such supplement cooperating with the illustrated construction of the feeder in restricting the liquid supplement consumption to a desired level.

Briefly, in a preferred embodiment of the present invention illustrated in FIGS. 1–4, a liquid supplement feeder 7 includes a container or tank 9 and a cover or lid 11 for the tank. An opening or hole 13 is provided in the cover 11 to afford access internally of the tank 9, and a plate 15 is provided to selectively partially close or completely close the opening of the hole 13, as will be described in detail hereinafter. A liquid supplement elevating device, such as a wheel 17 is rotatably supported internally of the feeder 7 and is carried on the underside of the lid 11 below the hole 13. A circumferential portion of the wheel extends into the region of the hole 13 without extending above the plane of the top surface of the lid 11, while a portion opposite on the circumference of the wheel extends substantially to the bottom wall of the tank 9. The tank 9 is suitable for containing a supply of a liquid supplement 19, and the disposition of the wheel 17 is such as to cause the wheel to be at least partially submerged in the liquid supplement 19 when a supply of the supplement is in the tank. Thus, as the wheel rotates, its circumferential surface passes through the liquid supplement and picks up and carries a coating or layer of the supplement upwardly out of the liquid into the region of the hole 13. The hole 13, particularly as its opening is diminished by the selective positioning of the plate 15, provides limited access through the hole 13 to the upper surface of the wheel 17 and the coating of liquid supplement 19 thereon.

An animal, such as a cow 21, extends its tongue into the available opening of the hole 13 to lick the surface of the wheel 17, thereby removing some of the liquid supplement 19 that coats the wheel. The wheel 17 is rotatable and rotation is caused by the licking action of the cow, to bring into exposure another portion of the wheel's coated surface.

More specifically, the tank 9 is preferably of a size that will contain a supply of the liquid supplement sufficient to last a herd of cattle being fed for several days. In accordance with the principles of the present invention, it has been found that about 50 cattle is a suitable number that will consume an adequate ration of the liquid supplement 19, yet without overconsumption, from one restricted opening of the above type. Further, it has been found in feeding cattle that nutritionally, overconsumption occurs above an average of three pounds of liquid supplement per head per day. Hence, it is desirable to restrict the intake of liquid supplement to something less than this amount. Thus, if an eight-day supply is desired so that a regular replenishing schedule of once a week can be readily established, a tank capacity of about 1000–1200 pounds of liquid supplement for a herd of 50 cattle is suitable.

For purposes of illustration only, the tank 9 is shown with provision for two restricted openings, and is suitable for feeding a herd of 100 cattle. It should be understood, however, that the tank 9 can be larger or smaller with more or fewer openings as suitable for the circumstances.

As described hereinafter in more detail, the liquid supplement 19 may have a relatively high acidity which means a low pH number. Hence, the liquid supplement is potentially corrosive to the tank 9 and associated parts of the feeder 7. Preferably, therefore, the tank 9, the lid 11, the plate 15 and the wheel 17 should be made of a material that is not subject to corrosion, such as plastic, fiberglass or the like.

The lid 11 has provided therein one or more holes 13 as required to provide one restricted feeding opening for each 50 cattle. Accordingly, the size of the feeder 7 will depend upon the size of the herd being fed. In addition to the feeding holes 13, another hole, known as a fill-hole (not shown), is provided near one end of the feeder 7. A cover plate 23 is provided over the fill-hole.

The cover plate 23 is mounted by suitable means in a manner that will allow easy moving of the cover plate from over the fill-hole, such as by a pair of screws 25, one being in a corner mounting hole of the plate and the other in a slotted mounting hole 27. Thus, by simply loosening the screws 25 and not removing them, the plate can be rotated to uncover the fill-hole. This fill-hole provides for the replenishing of the liquid supplement supply in the tank 9 while the cattle are feeding. The cover plate 23 for the fill-hole has purpose in keeping rain and other foreign matter from entering the tank interior through the fill-hole and in preventing the cattle from obtaining liquid supplement through the fill-hole.

Figure 3:
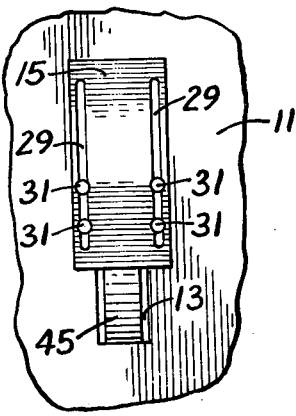
FIG. 3 is a plan view of a portion of the feeder of FIG. 1 and illustrating in detail an opening in the cover of the feeder and a slidable plate over the opening.
Figure 4:
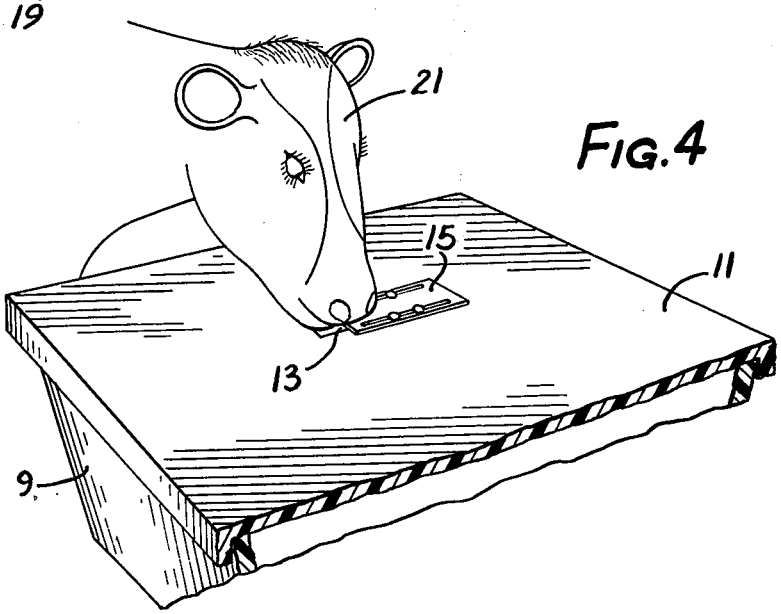
FIG. 4 is a perspective view of a portion of the feeder of FIG. 1 depicting an animal consuming some of the contents thereof.

As indicated, the plates 15 over the holes 13 are adapted to be slidably mounted. As best seen in FIG. 3, each plate has slots 29 extending parallel to and inwardly of the side edges of the plate. Each plate 15 is retained in position by suitable holding means, such as a set of bolts 31. A pair of these bolts 31 fit within each of the slots 29 and limit the extent of movement of the plate 15. The bolts also serve as a means of securing a selected position of the plate in relation to the hole 13 to provide the desired degree of opening. As can be determined in FIG. 3, the plate 15 is slidable from a position that would completely close the opening and cover the entire hole 13 to a position substantially exposing the hole 13. Thus, a selected position can be established to provide a restricted opening through the hole 13 to the interior of the tank 9.

Figure 2:
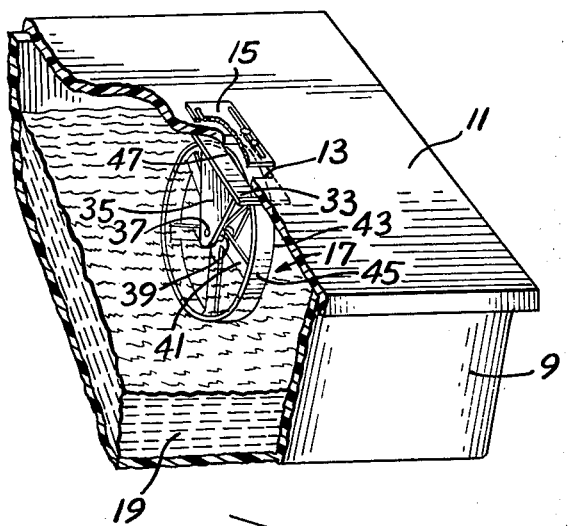
FIG. 2 is a perspective view of a broken away portion of the feeder of FIG. 1 and illustrating a supplement elevating device internally thereof.

The wheel 17 is mounted immediately under the hole 13, as best seen in FIG. 2 on the underside of the lid 11. The wheel 17 includes a mounting plate 33 from which extend a pair of parallel side supports 35 that near their distal ends carry an axle 37 on which the wheel 17 rotates. The wheel 17 includes a hub 39, a plurality of spokes 41 extending radially from the hub 39, and a flat rim 43 having an outer circumferential surface 45.

The mounting plate 33 of the wheel 17 has a central rectangular opening 47 which exposes the adjacent surface 45 of the rim. The mounting plate 33 is attached to the underside of the lid 11 in any suitable manner. The mounting plate 33 is attached to lid 11 in position so that the opening 47 substantially coincides with the hole 13. The construction of the entire wheel 17 is such that the rim 43 extends into the region of the opening 47 of the mounting plate 33 but not above the plane of the upper surface of the lid 11. Thus, the plate 15 is adapted to slide entirely across the hole 13 to close the hole without interference from the rim 43.

The placement of the rim 43 in the region of but below the top surface of the lid 11 is advantageous in restricting the consumption of liquid supplement by the cattle, since exposure of the rim 43 above the surface of the lid 11 allows an overconsumption of liquid supplement.

The diameter of the rim 43 is sufficient to extend, when the wheel 17 is fully mounted as illustrated, down to a point near the bottom of the container 9. Thus, when there is liquid supplement 19 in the container, a portion of the rim 43, and more specifically, the circumferential surface 45 thereof, will always be in contact with the liquid supplement. When the capacity of the tank 9 is replenished, the level of the liquid supplement 19 may approach the top edge of the tank 9, in which instance the wheel 17 is essentially submerged in the liquid supplement. In any event, as long as at least a portion of the rim 43 is submerged in the liquid supplement, 19, a coating of the supplement is established on the rim, and particularly on the surface 45, which will be carried into a position of exposure to the tongue of the cow 21 as the wheel 17 rotates. The motive force for the rotation of the wheel is supplied by the licking action of the cow. Thus, as the cow licks the surface 45 of the wheel, the force of the tongue moves the wheel. The direction of rotation of the wheel 17 is not important. If an uncoated portion of the surface 45 is at first exposed to the cow's tongue, it will not require much licking before a coated portion is rotated into exposure in the hole 13.

EXAMPLE

One construction of a liquid supplement feeder 7 has been built that provided two holes 13 in retangular form each having dimensions of 2 and ¾ inches wide by nine and one-half inches long. The cover plates 15 were 5 inches wide by eleven inches long. The slots 29 were sevensixteenths of an inch wide by 9 inches long and located in the plate so that an inch of overlap remained at either end of the slots. Each wheel 17 was mounted so that the surface 45 came to a point of about ½ inch to 1 inch below the top surface of the lid 11. The respective adjustable plates 15 were each positioned so as to provide an opening of approximately 4 square inches for access to the surface 45 of the wheel therebelow. All essential materials were fiberglass.

Under these conditions only one animal could eat at one time at each restricted opening. Further, a liquid supplement having a pH of about 2.6 was provided. One hundred head of milk cows were fed for 4 months, and the consumption of liquid supplement was observed. The average consumption was about 1.78 pounds per cow per day. This consumption was adequate for nutrient balance and yet was under the predetermined limit of three pounds per cow per day.

The illustrated construction of the present invention provides several advantages over conventional self-feeders. For example, cattle having free access to a conventional lick wheel feeder may consume as much as 14 pounds of liquid supplement per animal per day. In known roller-type feeders for molasses, the consumption per day per animal may be only slightly less than in the open lick wheel type. Such, of course, is many times greater than the preferred three pounds per animal per day mentioned earlier.

The illustrated construction also provides advantages over feeding systems wherein only the acidity of the liquid supplement is increased so as to discourage high consumption. While it has been found that increasing the acidity of the liquid supplement does result in a lower consumption of the liquid supplement, it does not of itself reduce the consumption in a self-feeding system to the aforementioned preferred level.

The illustrated construction further provides advantages over known experiments of adding a bittering agent, such as sucrose octa acetate, to the liquid supplement to discourage consumption. The cattle eventually become accustomed to the bittering agent and any reduction in the consumption of the liquid supplement by the animals is not necessarily a lasting one.

However, some control of feeding rate can be accomplished by adjustment of the acidity and the level of bittering agents in combination with the structure herein described.

Summarizing, the present invention provides a system for the self-feeding of a liquid supplements to the regular feed ration of dairy and beef cattle wherein the per animal per day consumption of the liquid supplement is under 3 pounds. Thus, there has been provided a liquid supplement feeder 7 constructed in accordance with the principles of the present invention that includes a tank 9, a lid 11 for the tank 9, the lid 11 having at least one hole 13 therein. Carried under the hole 13 is a rotatable wheel 17 that is in contact with a liquid feed supplement 19 contained in the tank 9. The hole 13 has a slidably mounted plate 15 located thereover so as to control the size of the opening of the hole and thereby an exposure to the surface 45 of the wheel 17 carrying a layer or coating of the liquid supplement. When a cow licks the surface 45 to obtain the coating of liquid supplement 19 thereon, it at the same time causes the wheel to rotate so as to move more of the liquid supplement into exposure. This construction of a feeder 7 further may be combined with a liquid supplement having a pH of 4.0 or under, and the resulting combination is also effective in limiting the intake of the liquid feed supplement by a feeding animal.

While the invention has been described in connection with a preferred embodiment, many alternatives, modifications, and variations may be apparent to those skilled in the art in view of the foregoing description. Accordingly, it is intended to embrace all such alternatives, modifications, and variations as fall within the spirit and scope of the appended claims. Further, while dairy or beef cattle have been used in connection with the present description, the principles of the invention are useful for application to other animals, although such application may require compensatory adjustments in dimensions and weights as appropriate.

Various features of the invention are set forth in the following claims.

What is claimed is:

1. A liquid supplement feeder of the self-feeding type for animals, comprising a container for the liquid supplement, a cover on the container, the cover having an opening therethrough, means for elevating the liquid supplement into the opening, said elevating means disposed within said container under the opening so that the supplement is raised at its maximum height to a point subjacent the top surface of the cover, a plate slidably mounted on the upper surface of the cover over the opening, and means for mounting said plate, said means for mounting including means for adjusting the position of said plate with respect to the opening so as to effectively control the size of the opening through said cover and thereby restrict the liquid supplement consumption of the animals.

2. A feeder in accordance with claim 1 wherein said means for elevating the liquid supplement is a wheel disposed such that its circumference extends substantially from the bottom of said container and into the region of the opening in said cover and is mounted so as to be freely rotatable.

3. A feeder in accordance with claim 1 adapted for use with a liquid feed supplement in the feeder, said supplement having a pH of less than about 4.0.

* * * * *